United States Patent Office 3,443,611
Patented May 13, 1969

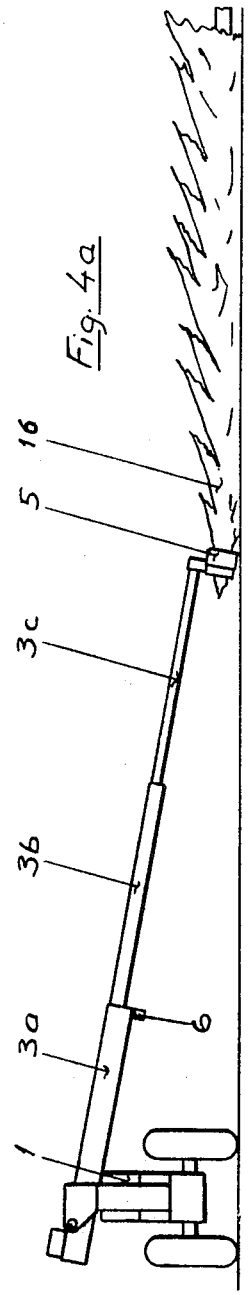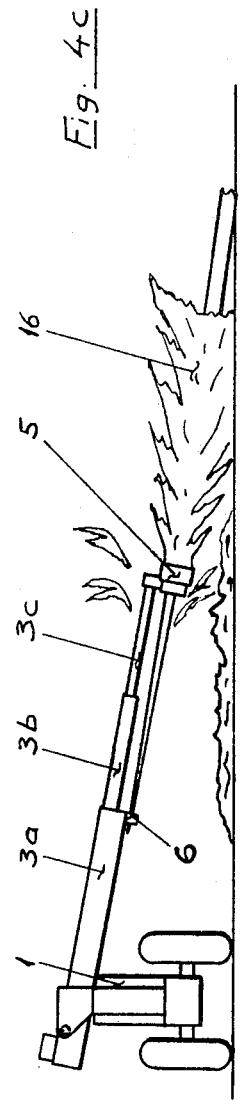

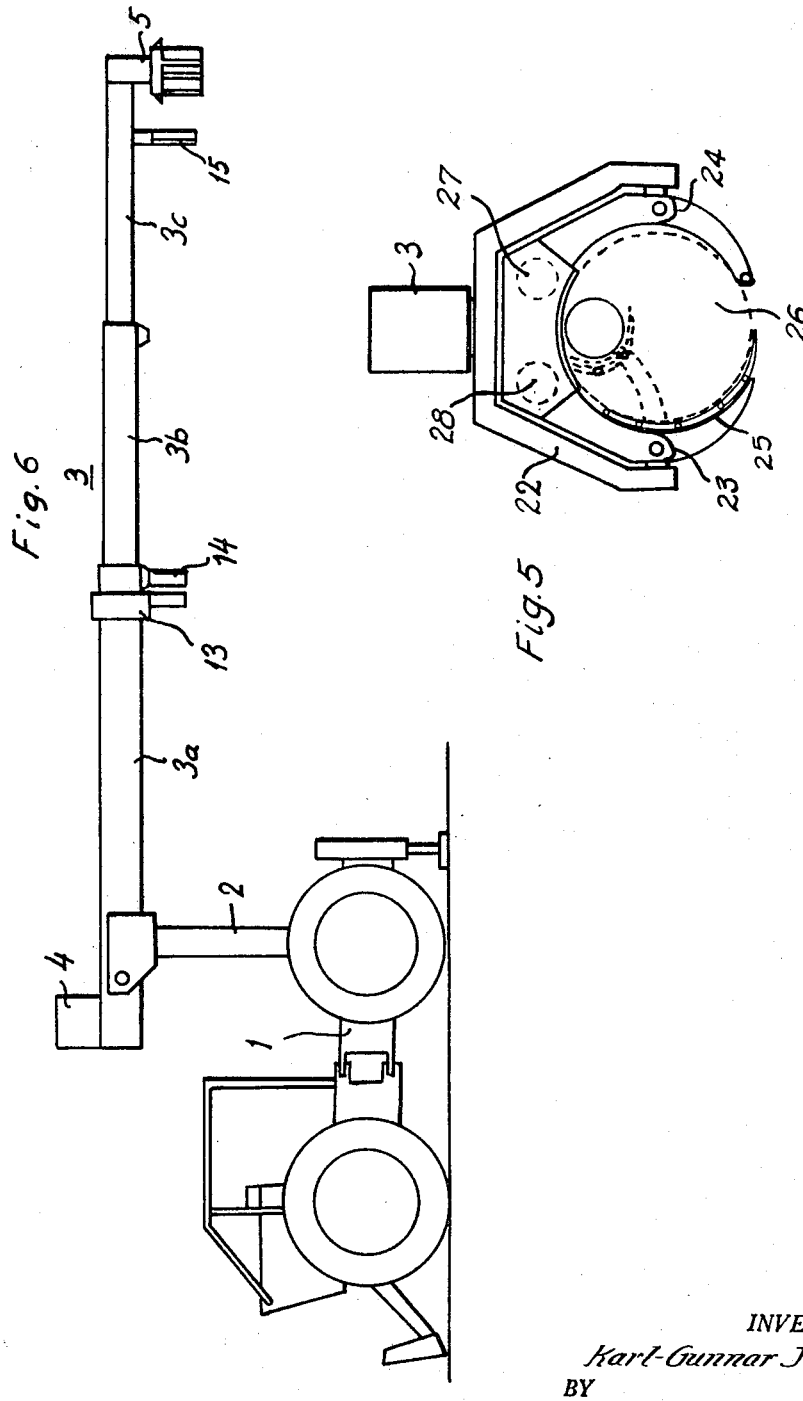

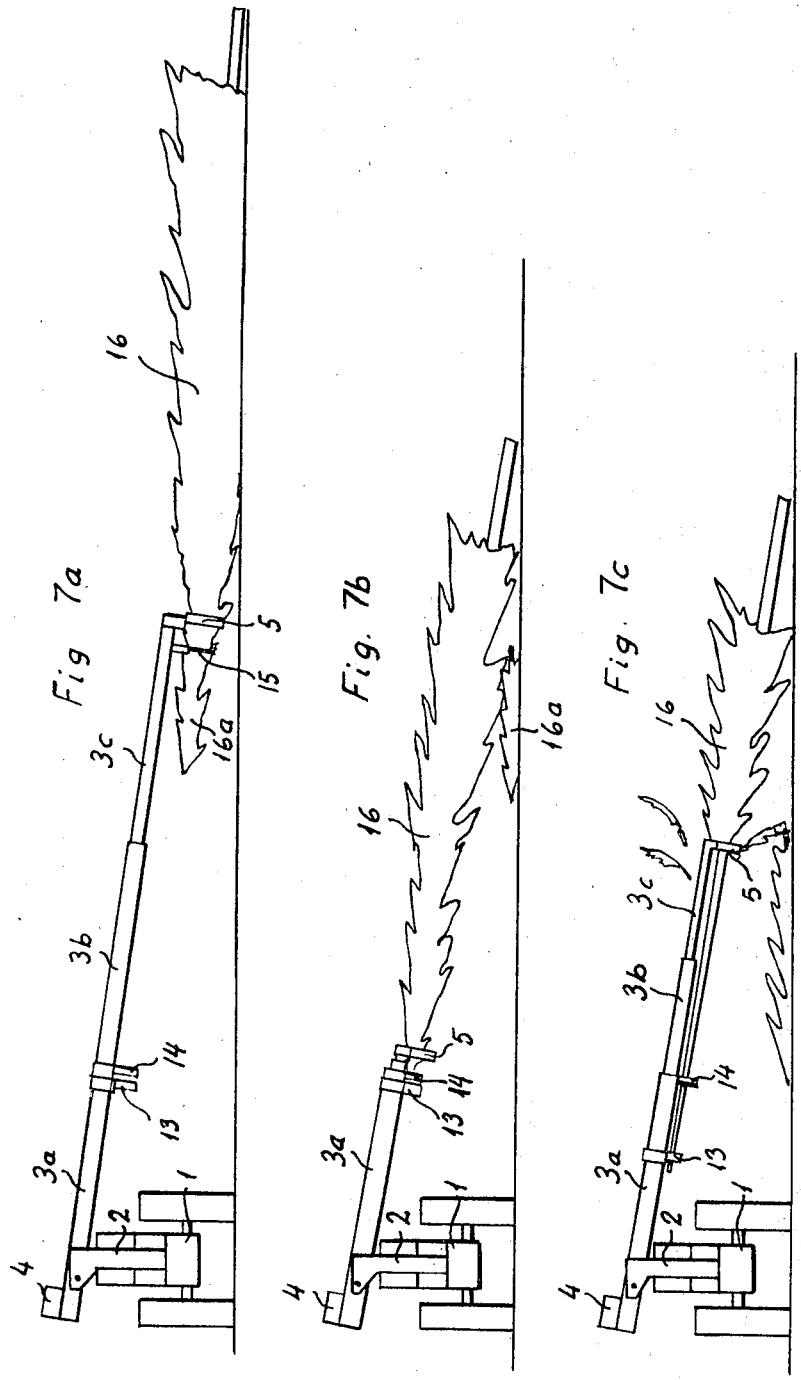

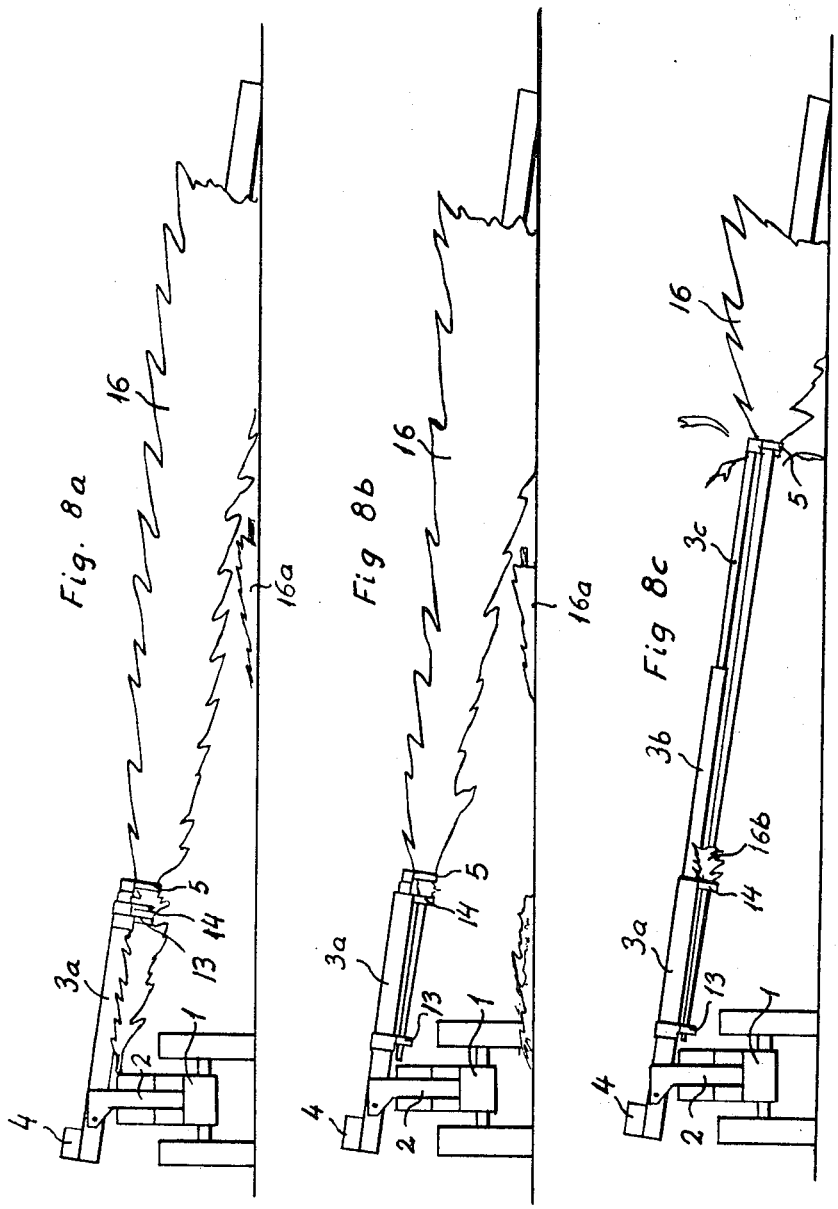

3,443,611
TREE-TRIMMING MACHINE
Karl-Gunnar Jorgensen, Solna, Sweden, assignor, by mesne assignments, to Logma Aktiebolag, Solna, Sweden, a Swedish company
Filed June 2, 1966, Ser. No. 554,780
Claims priority, application Sweden, June 10, 1965, 7,615/65; Mar. 15, 1966, 3,442/66
Int. Cl. B27c 9/00
U.S. Cl. 144—2      13 Claims

ABSTRACT OF THE DISCLOSURE

A tree-trimming machine comprises a forest type tractor which mounts a loading crane having a rotatably mounted crane post to which is hingedly connected a horizontally extending three-section telescopic jib. The outer end of the outermost jib section mounts a fixed combined trimmer and gripper. The outer end of the innermost jib section mounts a fixed gripper. The combined gripper and trimmer grips the top of a felled tree and pulls it up to where it is held by the gripper on the inner jib section, and then as the outer jib section is extended, the combined tool trims the branches.

Figure 1:
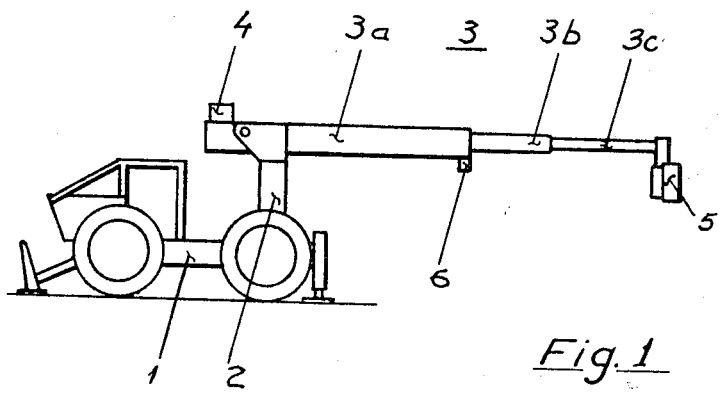

According to one modification of the gripper on the innermost jib section is mounted for slidable movement, and the outer end mounts a fixed trimmer. In this modification the outermost jib section also carries a topping saw. According to a second modification, the movable tool on the innermost jib section is a combined gripper and trimmer. In the modifications, the movable tool pulls the top of the trunk toward the crane post thereby increasing the trimming length.

---

The present invention relates to a trimming machine for the trimming of felled trees. The object of the invention is to provide a trimming machine of this type, which is simple, light and inexpensive, has a high production capacity, can be easily and rapidly moved from one working site to another and which can itself bring forward and trim trees felled within a considerable area about the working site of the machine.

The trimming machine according to the invention is characterized in that it consists of a vehicle, preferably a conventional forest type tractor, on which a loading crane is mounted provided with an extensible jib, preferably a telescopic jib, with two or several jib sections, a holding tool mounted on the innermost jib section for gripping and holding a tree brought forward to the trimming machine at the one end of the tree, and a cutting type trimming tool mounted at the outer end of the outermost jib section.

A trimming machine according to the invention operates in the following manner. The felled tree brought forward to the trimming machine is held at its one end in the holding tool on the innermost jib section and the trimming tool attached to the outermost jib section is moved along the trunk of the tree by variation of the length of the crane jib. Preferably the trimming is performed by extension of the jib from its shortest length so that the trimming is carried out from the end of the tree held in the holding tool. When the trimming tool is moved along the trunk of the tree, it will cut off the branches of the tree, the extension force of the jib providing the necessary cutting force for the trimming process.

The trimming tool on the outermost jib section is preferably designed so as to be alternatively useable as a gripping tool, by means of which a felled tree can be gripped at its one end and pulled in to the innermost jib section by retraction of the jib. In this way the trimming machine can itself bring forward the felled trees from the felling sites and the operating radius of the machine will correspond to the sum of the maximum length of the jib and the length of the felled trees, provided the trees are felled in direction towards the site of the trimming machine.

In a preferred form of the trimming machine according to the invention the holding tool on the innermost jib section is movable along this innermost jib section. This gives the additional advantage that when a first portion of the tree has been trimmed by means of the trimming tool on the outermost jib section, the tree can be pulled in further towards the crane post by means of the movable holding tool, whereafter a new portion of the tree can be trimmed by means of the trimming tool on the outer end of the jib. In this way the maximum trimming length is increased. The crane jib is in this case preferably attached to the crane post in such way that the trimmed trunk of the tree can be pulled past the crane post, whereby the maximum trimming length is further increased.

In this form of a trimming machine according to the invention a fixed trimming tool of the cutting type is preferably arranged at the outermost end of the innermost jib section with its cutting edges facing the outer end of the jib. It will then be possible to trim the portion of the tree, which is enclosed by the combined trimming and gripping tool on the outer end of the jib when the tree is being pulled in to the machine, by pulling said portion of the tree by means of the movable holding tool on the innermost jib section through said additional trimming tool on the outer end of this innermost jib section.

The movable holding tool on the innermost jib section can preferably be designed so as to be alternatively useable as a trimming tool of the cutting type with its cutting edges facing the inner end of the jib. If the holding tool is designed in this way the untrimmed tree at the beginning of the trimming process can be pulled in almost to the crane post, whereafter the portion of the tree lying along the innermost jib section can be trimmed by displacement of the combined holding and trimming tool from the outer end of the innermost jib section towards the crane post. This type of operation is particularly preferable for the trimming of big trees.

A trimming machine according to the invention is comparatively simple and inexpensive, as the forest type tractor and also the loading crane with its extensible and retractable telescopic jib can be of standard type to a very large extent and the additional components of the machine, as the trimming tool and the holding tool and the operating and control means therefore, are comparatively simple. The trimming machine can easily be moved from one working site to another, as the mobility of the trimming machine is just as good as that of a conventional forest type tractor. Further, the trimming machine has a high production capacity and is labour-saving, as it can be operated by a single man and it is possible by means of the trimming machine itself to bring forward trees felled within a considerable area around the working site of the machine. When a tree has been trimmed, the trunk can be transferred to a timber bundle by means of the loading crane on the trimming machine, and this is possible also in connection with intermediate cutting, when some of the trees in the stand are left unfelled.

Figure 9:
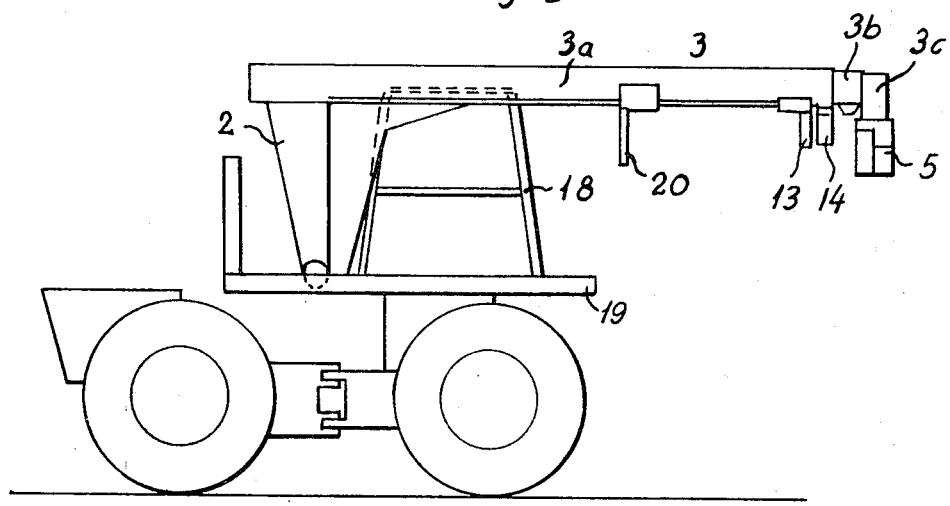
Figure 10:
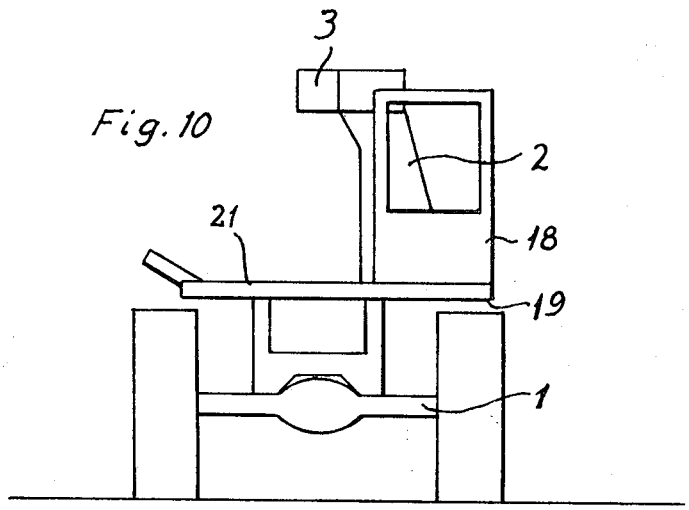

Additional features and advantages of the trimming machine according to the invention will be further described in the following with reference to the accompanying drawings, in which some embodiments of the invention are shown by way of example. In the drawings FIG. 1 shows schematically a first embodiment of a trimming machine according to the invention, FIG. 2 is a side elevation on a larger scale of the trimming tool on the trimming machine in FIG. 1, FIG. 3 is a front elevation of the trimming tool, FIGS. 4a, 4b and 4c illustrate schematically the mode of operation of the trimming machine in FIG. 1, FIG. 5 shows another type of a combined trimming and gripping tool for the outer end of the crane jib, FIG. 6 shows schematically a trimming machine according to the invention, on which the holding tool is movable along the innermost jib section, FIGS. 7a, 7b and 7c illustrate schematically the mode of operation of the trimming machine in FIG. 6, FIGS. 8a, 8b and 8c illustrate in the same manner the mode of operation for a trimming machine of the type shown in FIG. 6, on which the movable holding tool on the innermost jib section is designed so as to be alternatively useable as a trimming tool, and FIGS. 9 and 10 show schematically still another embodiment of a trimming machine according to the invention.

The trimming machine shown in FIG. 1 comprises a forest type wheel tractor 1 principally of conventional design, on which a loading crane is mounted having a crane post 2 and a telescopic jib 3 with three jib sections 3a, 3b and 3c. On the rear end of the innermost jib section 3a there is a hydraulic winch 4 for the retraction and extension of the jib 3. At the outer end of the outermost jib section 3c there is a trimming tool 5 of the cutting type. At the outer end of the innermost jib section 3a there is a holding tool 6, by means of which the one end of a tree brought forward to the trimming machine can be gripped and held.

Figure 2:
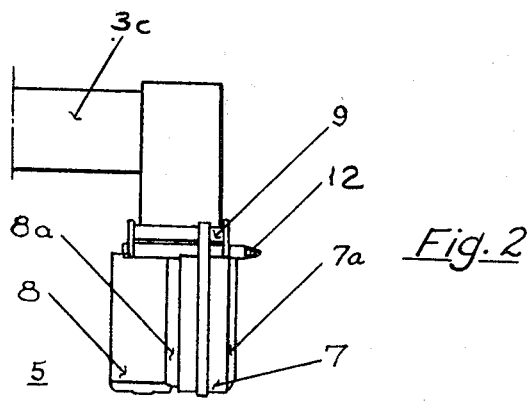
Figure 3:
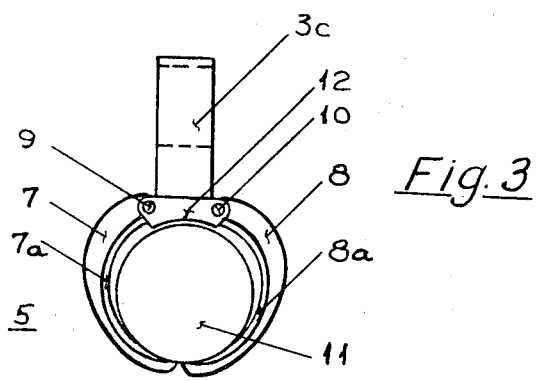

The trimming tool 5 can for instance be of the type shown in detail in FIGS. 2 and 3. This type of trimming tool, which is already known in the art, consists of two substantially semi-circular cutting arms 7 and 8, which are pivoted about two pivot pins 9 and 10 parallel to the direction of operation for the trimming tool but which are offset relative to each other in the axial direction so that they can be crossed. The cutting arms 7 and 8 have cutting edges 7a and 8a respectively facing away from the trimming machine. The two cutting arms 7 and 8 are spring-loaded towards each other, whereby they will rest against the tree trunk 11 inserted between the cutting arms. The trimming tool is consequently automatically adjusted to the diameter of the trunk to be trimmed. Between the pivot pins 9 and 10 for the cutting arms 7 and 8 there is a short stationary cutting knife 12. This trimming tool can also be used as a gripping tool if provided with suitable means so that the arms 7 and 8 can be brought to grip around the trunk 11 with a larger force than that used for the trimming operation.

Also other types of trimming tools of the cutting type can be used, as for instance the trimming tool shown in FIG. 5. This trimming tool comprises two link chains 25 enclosing each one half of the tree 26 to be trimmed. The links in the link chains are shaped as knives for cutting off the branches of the tree and the link chains can be wound up on rollers 27 and 28 respectively. The link chains 25 are guided in jointed arms 23 and 24 respectively. In FIG. 5 the trimming tool proper is pivoted about a horizontal axis in a yoke member 22, which is attached to the jib 3 so as to be rotatable about a vertical axis. In this way the trimming tool can automatically align itself coaxially to the trunk to be trimmed. This type of mounting the trimming tool on the crane jib can of course be used also for a trimming tool of the type shown in FIGS. 2 and 3.

The holding tool 6 on the innermost jib section can with exception for the cutting edges be designed fundamentally in the same way as the combined trimming and gripping tool 5.

FIGS. 4a, 4b and 4c show schematically three subsequent stages of the trimming of a felled tree with the trimming machine shown in FIG. 1. According to the mode of operation for the trimming machine illustrated in the drawing, the trees are felled in a direction towards the site of the trimming machine. When a felled tree is to be trimmed, the top end of the tree 16 is at first gripped, as shown in FIG. 4a, with the combined trimming and gripping tool 5 on the outer end of the outermost jib section 3c, whereafter by retraction of the jib the tree 16 is pulled in to the innermost jib section 3a so that the top end of the tree can be grasped and held by the holding tool 6 on the innermost jib section 3a, as shown in FIG. 4b. Thereafter the trimming is carried out by extension of the crane jib, whereby the trimming tool 5 is moved along the trunk of the tree and thus cuts off the branches of the tree with a cutting force corresponding to the extension force of the jib, as shown in FIG. 4c.

The trimming machine shown in FIG. 6 is to a large extent identical to the trimming machine shown in FIG. 1 and described above. On the trimming machine in FIG. 6, however, the holding tool 13 on the inner jib section 3a can be moved along this jib section 3a by suitable drive means, as for instance a hydraulic winch or similar device. Furthermore, there is an additional fixed trimming tool 14 of the cutting type mounted at the outer end of the innermost jib section 3a. This trimming tool can be of similar design as the trimming tool 5 and has its trimming edges directed towards the outer end of the jib. On the outermost jib section 3c there is also a cutting tool 15 of the saw or shear type, which is somewhat spaced from the trimming tool 5 and can be retracted into the jib section 3c, so that this jib section can be completely retracted into the jib section 3b. Alternatively this cutting tool can be designed as a part of the trimming tool 5. Finally, the machine in FIG. 6 differs from the machine in FIG. 5 in that the trimming tool 5 is provided with trimming edges on both sides.

FIGS. 7a, 7b and 7c show schematically the mode of operation of the trimming machine of FIG. 6. As shown in FIG. 7a the felled tree 16 is gripped by the combined trimming and gripping tool 5 on the outer end of the jib immediately below the upper limit for useful timber. With the aid of the cutting tool 15 the top 16a is cut from the tree 16 at this limit for useful timber and by retraction of the jib the top-cut tree 16 is pulled in to the innermost jib section 3a so that the fore end of the tree can be grasped and held by the holding tool 13 on the innermost jib section 3a, as shown in FIG. 7b. Thereafter the trimming is carried out by extending the jib once more, whereby the tool 5, now operating as a trimming tool, is moved along the trunk of the tree 16 so as to cut off the branches, as shown in FIG. 7c. Simultaneously or subsequently the tree 16 is pulled further in towards the crane post 2 by means of the movable holding tool 13, which is moved towards the inner end of the jib section 3a. The fixed trimming tool 14 on the outer end of the jib section 3a will then cut off the branches along the portion of the tree, which was embraced by the trimming and gripping tool 5, when the tree was pulled in to the inner jib section 3a, and along the short portion of the tree, which lies between the holding tool 13 and the trimming tool 5 in FIG. 7b. By hauling the tree all the way up to the crane post 5 by means of the movable holding tool 13 the total trimming length is also increased so as to correspond to the total maximum length of the jib 3.

The maximum trimming length can be further increased, if the jib 3 is attached to the crane post 2 in such a manner that a tree trunk lying parallel to the crane jib can extend past the crane post 2. If the trimming machine according to the invention is designed in this way, it will be possible, when a tree has been trimmed over a length corresponding to the maximum length of the crane jib, to pull the partially trimmed tree past the crane post 2 by means of the gripping tool 5, whereafter the remaining portion of the tree can be trimmed by renewed extension of the jib.

The possibility to haul the tree all the way up to the crane post 2 or even past the crane post is of a great value, when the trimmed trunk is to be transferred to a timber bundle by means of the loading crane. This is carried out by gripping the trimmed tree trunk at a suitable point by the gripping tool 5, whereafter the tree by means of the crane is raised so as to come clear off any remaining unfelled trees and is moved to and released at the place of the timber bundle. During this operation it is of course advantageous, if the center of gravity of the tree is as close as possible to the crane post 2.

When the tree is being trimmed by extension of the crane jib the operator on the machine can easily bring the trimming tool 5 to follow any curvatures of the tree trunk by swinging the crane jib sideways.

The mode of operation illustrated in FIGS. 7a, 7b and 7c can be used for slender and reasonably thick trees. For very thick trees, however, the tree when in the position shown in FIG. 7b due to its own weight, will sag in an arc, which is so sharply bent close to the top of the tree as to prevent the trimming of the tree by extension of the combined trimming and gripping tool 5. This problem can, however, be eliminated by a very slight modification of the trimming machine shown in FIG. 6. According to this modification the holding tool 13 movable along the inner jib section 13a is designed so as to be alternatively useable as a trimming tool of the cutting type with its trimming edges directed towards the inner end of the crane jib. The mode of operation of such a trimming machine according to the invention when trimming thick and heavy trees is illustrated schematically in FIGS. 8a, 8b and 8c. In the position shown in FIG. 8a the top 16a of the tree has been cut off at the limit for useful timber in the manner described in connection with FIG. 7a and the tree has subsequently been gripped with the combined trimming and gripping tool 5 at a distance from the fore-end of the top-cut tree substantially corresponding to the length of the innermost jib section 3a and the tree has been pulled in to the trimming machine by complete retraction of the crane jib. Thereafter the portion of the tree lying along the innermost jib section 3a is trimmed by moving the combined holding and trimming tool 13 towards the crane post 5 at the same time as the tree is held by the gripping tool 5. When this portion of the tree has been trimmed by the combined holding and trimming tool 13, as shown in FIG. 8b, the holding tool 13 is brought to grasp and hold the tree at its fore end, whereafter the remaining portion of the tree is trimmed as previously described by means of the trimming tool 5 by extension of the crane jib, as shown in FIG. 8c. Simultaneously or subsequently the tree 16 can be pulled in further towards the crane post 2 by means of the movable holding tool 13 so that the remaining branches 16b immediately outside the fixed trimming tool 14 are cut off by this trimming tool.

If the required trimming length of the tree is larger than the maximum length of the crane jib it is also in this case possible to increase the maximum trimming length by pulling the tree past the crane post 2, provided the crane jib is attached to the crane post in a manner permitting this.

A trimming machine according to the invention can also be designed in such a way that after the trimming of a tree the machine can itself cut the trimmed trunk into predetermined lengths. FIGS. 9 and 10 in the enclosed drawing show schematically a trimming machine according to the invention designed in this way. This trimming machine differs from the trimming machine in FIG. 6 substantially only therein that the crane with its crane post 2 and the jib 3 is mounted together with a driver's cab 18 on a rotatable platform 19 on the forest type wheel tractor 1. The crane is designed substantially in the same way as in the trimming machine in FIG. 6 but is provided also with a cutting tool 20 on the innermost jib section 3a. This cutting tool can be of a saw type or a shear type and is preferably designed so as to be able to cut the trunk when this is fed past the cutting tool without any interruption of the movement of the trunk. The platform 19 is provided with a pocket 21 for the cut timber at the one side of the crane post 2 and the cab 18.

The cutting of the trimmed trunk is preferably carried out in such a way that the operator, when the trimming of the tree is completed, extends the crane jib so that the trimmed tree can be gripped at its root end with the combined trimming and gripping tool 5 on the outermost jib section 3c. Thereafter the trimmed trunk is fed towards the crane post 2 by retraction of the crane jib and the cutting tool 20 will at the same time automatically cut the trunk into predetermined lengths. The cutting tool 20 is preferably controlled in relation to the actual length of the crane jib in each moment so that the cutting tool 20 will cut the trunk automatically at multiples of the predetermined timber length as measured from the root end of the trunk. The cut timber can be stored in the pocket 21 or dumped on the ground.

In a trimming machine of this type the combined trimming and gripping tool 5 is preferably designed in such a way that it can grasp and pull forward a new untrimmed tree up to the trimming machine at the same time as it feeds a trimmed tree towards the machine for the cutting thereof into lengths. Further a trimming machine of this type can of course be provided with several timber pockets for different assortments of timber.

In the above it has been assumed that the trimming of the felled trees is carried out from the top end of the trees. This has the advantage that the trimming machine can from one and the same site of operation bring forward and trim trees felled within a comparatively large area, provided the trees are felled in directions towards the site of the machine. However, it is of course also possible to trim the trees from their root ends, in which case the total working range of the machine from one and the same site is reduced. On the other hand, it will in this case be possible to use the trimming machine also for the felling of the trees, if a felling tool of the saw type or the shear type is mounted on the outer end of the telescopic jib.

In order to increase the maximum trimming length still more, the loading crane can be designed in such a way that the rear end of the crane jib is extending with a substantial length past and behind the crane post or is provided with a jib section, which can be projected rearwards behind the crane post so that the crane jib is extended rearwards. Such a design gives also the trimming machine an improved stability when heavy trees are being trimmed. The movable holding tool shall in this case be arranged on the section of the jib, which is projecting or extensible rearwardly behind the crane post. In a trimming machine of this design it may be preferable to arrange the different tools on the machine in such a way that the tree being trimmed lies above the crane jib.

The range of operation of the trimming machine can also be increased without any corresponding increasement of the length of the crane jib, if the crane post is made in two mutually jointed portions or if the crane post is attached to the tractor through a pivot joint.

I claim:
1. A trimming machine for the trimming of felled trees, comprising a vehicle, a crane mounted on said vehicle and including a crane post and an extendable and retractable crane jib with at least two jib sections, a holding tool on the innermost jib section for grasping and holding a felled tree at the one end of the tree, a trimming tool of the cutting type mounted on the outer end of the outermost jib section, whereby a tree can be trimmed by holding one end of the tree in said holding tool and moving said trimming tool along the trunk of the tree by variation of the length of said crane jib, said holding tool being movable along said innermost jib section, and an additional trimming tool of a cutting type at the outer end of said inner- most jib section with its trimming edges directed towards the outer end of said crane jib.

2. An apparatus for delimbing felled trees, comprising a vehicle, a jib crane mounted on said vehicle so as to be rotatable with reference to the vehicle about a vertical axis and having a substantially horizontally extending jib pivotal in a vertical plane, said jib including at least an innermost jib section and an outermost jib section extendable and retractable relative to said innermost jib section for variation of the effective length of said jib, a tree gripping device mounted on said innermost jib section, and a limb-shearing device mounted on the outer end of said outermost jib section whereby a felled tree can be delimbed by gripping and holding one end of the tree with said tree-gripping device and moving said limb-shearing device along the trunk of the tree by variation of the length of said jib.

3. An apparatus as claimed in claim 3, wherein said limb-shearing device on the outer end of said outermost jib section is alternatively operable as a tree gripping device for gripping and holding a tree, whereby a tree can be gripped and held at its one end with said combined limb-shearing and tree gripping device and pulled in to said innermost jib section by retraction of said outermost jib section.

4. An apparatus as claimed in claim 3, wherein said crane jib sections are telescopic elements.

5. An apparatus as claimed in claim 3, wherein said tree gripping device is mounted at the outer end of said innermost jib section.

6. An apparatus as claimed in claim 3 wherein said tree gripping device is slidably mounted on said innermost jib section so as to be movable along said innermost jib section.

7. An apparatus as claimed in claim 6, wherein said tree gripping device is provided with limb-shearing edges directed toward the inner end of said crane jib and is alternatively operable as a limb-shearing device.

8. An apparatus as claimed in claim 3, wherein said limb-shearing device on said outermost jib section is provided with first shearing edges facing outwards toward the outer end of said outermost jib section and second trimming edges facing in the opposite direction toward the inner end of said crane jib.

9. An apparatus as claimed in claim 3, comprising a top severing device mounted on said outermost jib section close to said limb-shearing device.

10. An apparatus as claimed in claim 3, comprising a trunk severing device mounted on said innermost jib section.

11. An apparatus as claimed in claim 3, wherein said jib crane includes a crane post mounted on said vehicle so as to be rotatable with reference to the vehicle about a vertical axis, said innermost jib section being attached to the upper end of said crane post with its longitudinal axis offset with respect to the longitudinal axis of said crane post so that a tree trunk extending along said innermost jib section may extend past said crane post.

12. An apparatus as claimed in claim 3, wherein said jib crane includes a substantially vertical crane post mounted on said vehicle so as to be rotatable with reference to the vehicle about a vertical axis, said innermost jib section being hinged to the upper end of said crane post so as to be pivotal in a vertical plane with reference to the crane post.

13. An apparatus as claimed in claim 3, comprising a platform mounted on said vehicle so as to be rotatable with reference to the vehicle about a vertical axis, said jib crane comprising a crane post having its lower end hinged to said platform so as to be pivotal in a vertical plane with reference to the platform, said innermost jib section being attached to the upper end of said crane post.

References Cited
UNITED STATES PATENTS

| | | | |
|---|---|---|---|
| 3,140,736 | 7/1964 | Propst | 144—2 X |
| 3,269,436 | 8/1966 | Moore | 144—3 |
| 3,323,563 | 6/1967 | Larson | 144—2 |
| 3,340,912 | 9/1967 | Williams et al. | 144—2 X |

FRANCIS S. HUSAR, *Primary Examiner.*

U.S. Cl. X.R.

144—309

UNITED STATES PATENT OFFICE

Certificate of Correction

Patent No. 3,443,611            Dated May 13, 1969

Karl-Gunnar Jorgensen

It is certified that error appears in the above identified patent and that said Letters Patent are hereby correct as shown below:

Column 7, lines 18, 26, 28, 31, 39; and

Column 8, lines 3, 6, 9, 17, 24, the claim reference numeral "3", each occurrence, should read -- 2 --.

SIGNED AND
SEALED
APR 7 1970

(SEAL)
Attest:

Edward M. Fletcher, Jr.
Attesting Officer

WILLIAM E. SCHUYLER, JR.
Commissioner of Patents